United States Patent
Theiss et al.

(10) Patent No.: US 6,820,727 B1
(45) Date of Patent: Nov. 23, 2004

(54) WEAR ADJUSTMENT DEVICE FOR A BRAKE

(75) Inventors: Armin Theiss, Mauth/Heinrichsbrunn (DE); Johann Iraschko, Schweitenkirchen (DE); Hans Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/979,276
(22) PCT Filed: Apr. 14, 2000
(86) PCT No.: PCT/EP00/03393
§ 371 (c)(1),
(2), (4) Date: Mar. 4, 2002
(87) PCT Pub. No.: WO00/71906
PCT Pub. Date: Nov. 30, 2000

(30) Foreign Application Priority Data

May 21, 1999 (DE) .......................... 199 23 457

(51) Int. Cl.$^7$ .......................... F16D 65/00; F16D 55/00
(52) U.S. Cl. .......................... 188/73.32; 188/73.1; 411/2
(58) Field of Search .......................... 188/72.1, 72.3, 188/72.7, 72.8, 73.1, 73.32, 73.44, 73.45; 411/2, 3, 4, 5

(56) References Cited

U.S. PATENT DOCUMENTS

| | | | | |
|---|---|---|---|---|
| 3,963,322 A | * | 6/1976 | Gryctko | 411/2 |
| 3,998,295 A | * | 12/1976 | Martin | 188/71.7 |
| 5,000,222 A | * | 3/1991 | Moenkhaus et al. | 137/505.41 |
| 5,020,949 A | * | 6/1991 | Davidson et al. | 411/7 |
| 5,439,276 A | * | 8/1995 | Jerina et al. | 303/56 |
| 5,697,929 A | * | 12/1997 | Mellinger | 411/5 |
| 5,788,022 A | * | 8/1998 | Antony | 188/71.8 |

FOREIGN PATENT DOCUMENTS

| | | | | |
|---|---|---|---|---|
| DE | 196 32 917 A1 | | 2/1997 | |
| DE | 19632917 A1 | * | 2/1997 | B60T/8/52 |
| EP | 0 566 008 A1 | | 10/1993 | |
| EP | 566008 A1 | * | 10/1993 | F16D/65/56 |
| GB | 2304387 A | * | 3/1997 | F16D/65/38 |

* cited by examiner

Primary Examiner—Robert A. Siconolfi
(74) Attorney, Agent, or Firm—Crowell & Moring LLP

(57) ABSTRACT

The invention relates to a wear adjustment device for a brake, especially a motor vehicle brake. The device comprises an adjusting shaft, which is mounted in a housing and is accessible from the outside at a front end. Said adjusting shaft is equipped with a head part in the accessible area, this head part enabling the transmission of a torque. The head part is configured as a separate structural part and can be coupled to the adjusting shaft in such a way that it is resistant to torsion in the axial direction of the adjusting shaft and in relation to said adjusting shaft. The head part is also provided with a predetermined breaking point which enables separation to take place when a maximum permissible torque is exceeded. This constructionally simple configuration reliably prevents the adjusting shaft from being overburdened and therefore prevents any damage to the wear adjustment device or essential parts of the break that this could otherwise cause. In the event that the head part is destroyed, the destroyed head part can be replaced by a new head part without impairing the brake as a whole.

26 Claims, 2 Drawing Sheets

WEAR ADJUSTMENT DEVICE FOR A BRAKE

The present invention relates to a wear adjustment device for a brake, particularly a motor vehicle brake, having an adjusting shaft which is mounted in a housing, particularly a caliper, and is accessible from the outside at a front end, which adjusting shaft is equipped with a head part in the accessible area, which head part permits the transmission of a torque.

Brakes having a wear adjustment device of the above-mentioned type are known per se.

Such a wear adjustment device ensures that the lifting play is almost constant for the entire service life, which is achieved by a self-adjustment of the brake linings acting upon a brake disk in the event of a corresponding wear.

If the brake lining is almost completely worn, a new brake lining is installed for avoiding a brake failure. For this purpose, the maintenance mechanic can return the adjusting spindle into its starting position in order to create sufficient space for a new brake lining.

The adjusting spindle can be rotated back only to an end stop, so that there is the risk that a maintenance mechanic may unintentionally try to turn the adjusting spindle although the end stop has been reached. This may result in damage and destruction of the adjustment device.

In order to eliminate this danger, suggestions have been made which basically point into the right direction.

Thus, it is known, for example, from European Patent Document EP 0 566 008 B1 to equip the adjusting shaft with a separating device, particularly also in the form of a desired breaking point, which responds at a certain limit torque. When a permissible limit torque is exceeded, this separating device causes a shearing-off of the outer face-side head area of the adjusting shaft.

Although this reliably prevents an overloading and damaging of the adjustment device and of the brake, the adjusting shaft as a whole is simultaneously also rendered useless.

German Patent Document DE 196 32 917 A1 contains the suggestion to equip the adjusting shaft with a torque-transmitting element which, for preventing the transmission of an undesirably high torque to the shaft, should be deformable.

It is an object of the present invention to design a wear adjustment device of the above-mentioned type such that a limiting of the torque which can be transmitted to the adjusting shaft is permitted without any damage to or destruction of the adjusting shaft itself. In this case, it is simultaneously ensured that the torque which can maximally be transmitted to the adjusting shaft can be determined more precisely.

This object is achieved according to the invention in that, in the case of a wear adjustment device of this type, the head part is constructed as a separate component and, in the axial direction of the adjusting shaft as well as with respect to the adjusting shaft can non-rotatably indirectly or directly be coupled with the latter and is equipped with a desired breaking point which, when a maximally permissible torque is exceeded, results in a shearing-off of the section coupled with the adjusting shaft with respect to the section facing away from the adjusting shaft.

The present invention, on the one hand, avoids the disadvantage of the destruction of or damage to the adjusting shaft in the event of the application of an unacceptably high torque, but also achieves, on the other hand, that the maximally permissible torque leading to the shearing-off can be predetermined within narrow limits, because the shaping of the head part with its desired breaking point can be designed mathematically and also constructively very precisely with respect to the transmissibility of a maximally permissible torque.

In the case of a construction designed for a pure deformation of material, the latter by far cannot be achieved with this precision.

The desired breaking point is formed by a surrounding groove of the head part, which is particularly simple with respect to the construction and manufacturing.

In this case, it is preferable to construct the groove as a notch-type groove with an approximately U-shaped cross-section.

Additional characteristics are the object of additional subclaims.

Embodiments of the invention are illustrated in the attached drawings and will be described in detail in the following.

Figure 1:
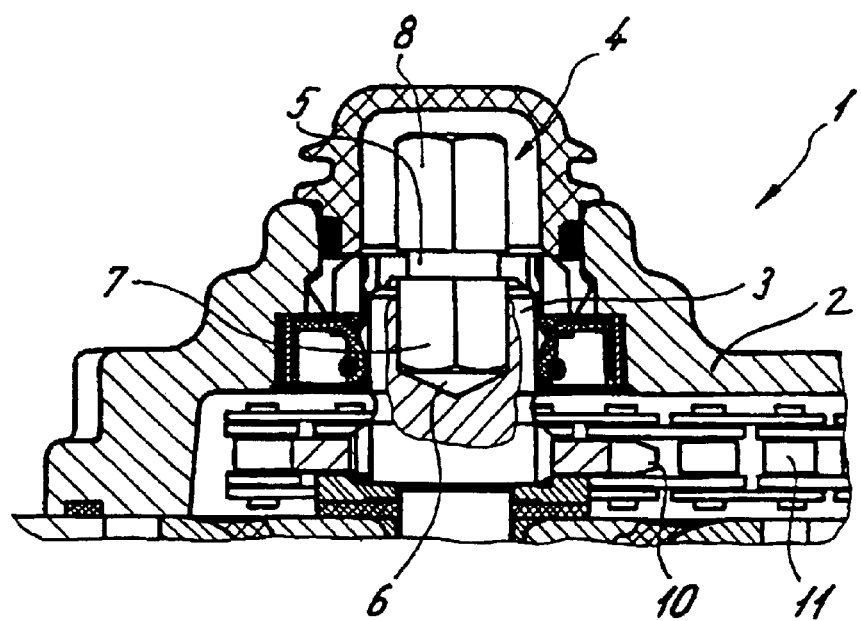
FIG. 1 is a longitudinal sectional view of a wear adjustment device according to the invention for a brake.

In FIG. 1, reference number 1 indicates a wear adjustment device as a whole for a brake which is not shown in detail, particularly a motor vehicle brake, which has an adjusting shaft 3 disposed in a housing 2, particularly a caliper, and accessible from the exterior at a front end. In the accessible area, this adjusting shaft 3 is equipped with a head part 4 permitting a torque transmission.

The complete construction of a brake, particularly a motor vehicle brake, having a wear adjustment device 1 with this basic construction is clearly indicated in European Patent Document EP 0 566 008 B1, to which reference is explicitly made here. From the above-mentioned reference, the known method of operation of such a wear adjustment device 1 is also obtained. Thus, while referring to the respective disclosure content of European Patent Document EP 0 566 008 B1, a detailed description and illustration will not be required at this point. The reason is that the present invention only involves constructive characteristics which have the objective of preventing damage to or destruction of the parts required for a safe operation of a brake when the adjusting spindle 3 has to be rotated back into its starting position for the purpose of exchanging the brake shoes. In this case, a construction is to be implemented which is extremely appropriate with respect to the practical application and is reasonable in price, particularly also with respect to servicing.

In order to achieve this endeavored goal, the head part 4 provided for operating the adjusting shaft 3 is constructed as a separate component and is equipped with a desired breaking point 5. The head part 4 constructed as a separate component can be coupled with the adjusting shaft 3 while being resistant to rotating with respect to the adjusting shaft.

In the embodiment according to FIG. 1, the adjusting shaft 3 is equipped for this purpose at its end facing the head part 4 with a polygonal recess 6—similar to the hexagon socket of a screw—, and the bolt-shaped head part 4 is equipped with a cross-sectionally adapted projection 7. This projection 7 permits the rotation-resistant insertion of the head part 4 into the polygonal recess 6 of the adjusting shaft 3. Naturally, a rotation-resistant coupling of the head part 4 with the adjusting shaft 4 can also be achieved by geometrically arbitrarily different designs of the recess 6, on the one hand, as well as of the projection 7, on the other hand. Thus, for example, the recess 6 and the projection 7, in addition to having polygonal constructions, such as a multiple-groove profile, can also be constructed in a tooth shape as well as—generally, also in an arbitrarily non-circular shape. It is only important in this case that a shape is selected which prevents a rotation of the projection 7 within the recess 6.

A cross-sectional shape of the recess 6 as well as of the projection 7 is preferred which prevents the insertion of a commercially available screwing tool into the recess 6 in order to prevent in this manner an unauthorized direct operating of the adjusting shaft, for example, by means of a wrench for socket head cap screws.

In the area of its free end facing away from the adjusting shaft 3, the head part 4 is equipped with another projection 8 permitting a torque transmission, which projection 8 advantageously has the cross-sectional shape of a commercially available screwing tool, for example, in the form of a square or a hexagon.

As an alternative thereto, the projection 8 can naturally also be equipped with a square or hexagonal recess—for example, the hexagon socket according to the DIN—for inserting a corresponding screwing tool.

The desired breaking point 5 has the shape of a surrounding groove which represents a diminished cross-section of the entire head part 4. As a result of this diminished cross-section, it can be constructively predetermined at which torque the head part 4 is sheared off, this torque being selected such that damage to or a destruction of the operating parts important to the brake as well as of the entire wear adjustment device 1 is prevented.

Figure 2:
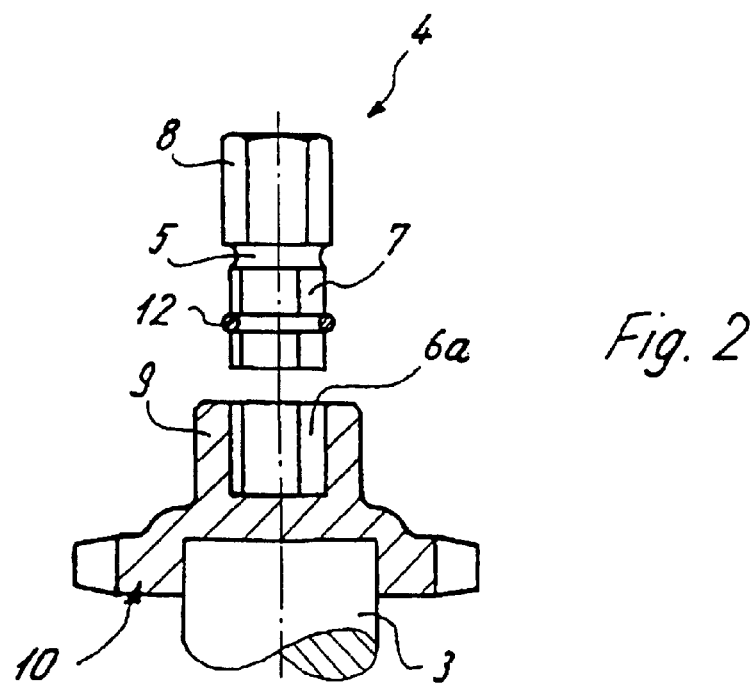
FIG. 2 is a view of the head area of an adjusting shaft of a wear adjustment device of a brake according to another embodiment of the invention.
Figure 2A:
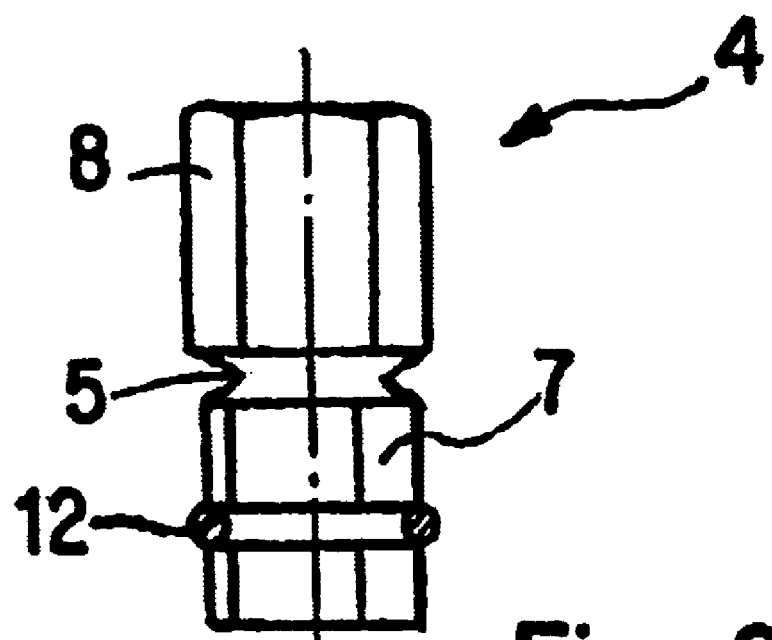
FIG. 2A is a view of the head area of an adjusting shaft of a wear adjustment device of a brake according to another embodiment of the invention.

In the illustrated embodiment, the desired breaking point 5 is constructed in the shape of a groove with a U-shaped cross-section. Naturally, also other groove shapes are conceivable; for example, a semicircular groove as shown in FIG. 2 can also be provided or a groove with a V-shaped cross-section as in FIG. 2A. In order to be able to maintain a twist-off torque which is as precise as possible, a cross-section with pronounced edges, for example, rectangular, was found to be advantageous.

A design of the head part 4 is also conceivable such that, between the projection 7 which can be coupled with the adjusting shaft 3 and the projection 8 provided for the application of a screwing tool, a step-shaped cross-sectional transition is provided by which the desired breaking point is defined. In the area of this step-shaped transition, a surrounding groove can additionally be provided which can then, for example, also again have an approximately V-shaped cross-section.

If the head part 4 is to remain constantly in contact with the adjusting shaft 3, it is advantageous to provide a frictionally engaged axial connection between the head part 4 and the adjusting shaft 3.

However, it is also conceivable to place the head part 4 only on the adjusting shaft 3 when—in the event of a required brake lining exchange—the adjusting shaft 3 is to be rotated back into its starting position.

If, in the case of this operation, an unacceptably high torque is then exercised on the head part 4, this results in a shearing-off of the upper projection 8 with respect to the lower projection 7 and thus only in a destruction of the head part 4, whereas all important components of the brake remain mechanically undamaged and thus fully operable. In this case, it is then only required to replace the head part 4 by a new intact head part 4.

FIG. 2 indicates that the head part 4 can be inserted not only directly into the adjusting shaft 3, but alternatively thereto, also into a recess 6a of a neck-shaped extension 9 of the chain wheel 10, which, in turn, is connected with the adjusting shaft 3 arbitrarily in a fixed and rotation-resistant manner. Such a chain wheel 10 is also provided in the case of the construction according to FIG. 1 and is used for driving a chain 11, by way of which a synchronization of the rotating movement of adjusting shaft 3 leads to another shaft extending axially parallel thereto. This basic construction of the synchronization is also known and is illustrated and described in the European Patent Document EP 0 566 008 B1 which has been mentioned several times.

Also the recess 6a in the area of the neck-shaped extension 9 of the chain wheel 10 is preferably equipped, as in the embodiment according to FIG. 1, with a cross-section which prevents the insertion of a commercially available screwing tool. The cross-section of the projection 7 of the head part 4 has a corresponding design. The upper projection 8 of the head part 4 provided for operating the head part 4 as well as the adjusting shaft 3 is, in turn, provided with a polygonal cross-section—corresponding to commercially available screwing tools.

The embodiment according to FIG. 2 also illustrates that the groove 5 forming the desired breaking point may have a semicircular cross-section.

The lower projection 7, which engages into the recess 6a of the neck-shaped extension 9 of the chain wheel 10, is equipped with a spring ring 12 for the axial securing of the head part 4 with respect to the chain wheel 10.

The present invention is based on the whole on the basic idea of using a separate head part 4 for rotating the adjusting shaft 3, which separate head part 4 is completely sheared off and therefore mechanically destroyed when a predetermined torque is exceeded, whereby, in contrast, for example, to German Patent Document DE 196 32 917 A1, a relatively simpler construction and also a different function is achieved because the overload protection in the case of the construction according to German Patent Document DE 196 32 917 A1 is based on a mechanical deformation, optionally also in the elastic area, within the limits of Hooke's straight line.

The head part 4 of the construction according to the invention can in principle be produced from all suitable materials. However, it is preferably constructed of metal.

List of Reference Numbers

1=wear adjustment device
2=housing
3=adjusting shaft
4=head part
5=desired breaking point
6=recess
6a=recess
7=projection
8=projection
9=neck-shaped extension
10=chain wheel
11=chain
12=spring ring

What is claimed is:

1. A brake wear adjustment device having a brake adjusting shaft, the wear adjustment device being mounted in a housing of a brake and being accessible from outside the housing at a front end, the brake wear adjustment device comprising:

a head part that couples with the adjusting shaft, said head part being accessible from outside the housing and permitting torque transmission to the adjusting shaft;

wherein the head part is a separate component that is coupleable with the adjusting shaft either directly or indirectly in an axial direction and with respect to the adjusting shaft in a rotation resistant manner; and wherein said head part has a desired breaking point which, when a maximally permissible torque is exceeded, results in a shearing-off of a section of the head part coupled with the adjusting shaft from a section of the head part facing away from the adjusting shaft, wherein the shearing-off occurs in a portion of the head part not in contact with the adjusting shaft.

2. The brake wear adjustment device according to claim 1, wherein the desired breaking point is formed by a groove surrounding the head part.

3. The brake wear adjustment device according to claim 2, wherein the groove is a notch-type groove having an approximately U-shaped cross-section.

4. The brake wear adjustment device according to claim 1, wherein the desired breaking point is formed by a step-shaped cross-sectional transition area of the head part.

5. The brake wear adjustment device according to claim 4, further comprising a surrounding groove provided in the step-shaped cross-sectional transition area.

6. The brake wear adjustment device according to claim 5, wherein the groove has an approximately V-shaped cross-section.

7. The brake wear adjustment device according to claim 1, wherein the head part has a projection in the area coupling with the adjusting shaft that permits a torque transmission with the adjusting shaft, and wherein the adjusting shaft is provided with a corresponding recess at an end facing the projection.

8. The brake wear adjustment device according to claim 7, wherein cross-sections of the projection and corresponding recess deviate from cross-sectional shapes of screwing tools.

9. The brake wear adjustment device according to claim 1, wherein the head part is provided with one of a projection and recess on a free end facing away from the adjusting shaft, a cross-section of the projection or recess corresponding to a cross-sectional shape of a screwing tool so as to permit a torque transmission.

10. The brake wear adjustment device according to claim 1, further comprising one of a chain wheel and a chain pinion fixedly mounted on a front end of the adjusting shaft, wherein the head part is coupled with the chain wheel or the chain pinion.

11. The brake wear adjustment device according to claim 10, wherein the chain wheel or chain pinion has a neck-shaped extension in which a recess is provided, said recess having a cross-sectional shape permitting a torque transmission; and wherein a projection of the head part having a corresponding cross-section is insertable in the recess to indirectly couple with the adjusting shaft.

12. The brake wear adjustment device according to claim 1, further comprising a frictional coupling between the adjusting shaft and a projection of the head part that is directly or indirectly coupled with the adjusting shaft, said frictional coupling being in an axial direction.

13. The brake wear adjustment device according to claim 1, wherein the head part is constructed in one piece of metal.

14. A brake adjusting shaft for a wear adjustment device of a motor vehicle brake, comprising:

a first shaft part mountable in a housing of the motor vehicle brake having a first end facing a front end; and a head part constructed as a separate structural component coupled one of directly and indirectly to the first part in a rotationally resistant manner so as to permit a torque transmission from the head part to the first part, said head part being designed with a defined breaking point enabling an axial separation of the head part to take place via a shearing action when a maximum permissible torque is exceeded, wherein the shearing action occurs in a portion of the head part not in contact with the adjusting shaft.

15. The brake adjusting shaft according to claim 14, wherein the defined breaking point is formed by a surrounding groove of the head part.

16. The brake adjusting shaft according to claim 15, wherein the groove is constructed as a notch-type groove having an approximately U-shaped cross-section.

17. The brake adjusting shaft according to claim 14, wherein the defined breaking point is formed by a step-shaped cross-sectional transition area of the head part.

18. The brake adjusting shaft according to claim 17, wherein a surrounding groove is provided in the step-shaped transition area.

19. The brake adjusting shaft according to claim 14, wherein the head part is provided with a projection in an area coupling with the first part to permit torque transmission to the first part, the front end of the first part having a corresponding recess that receives the projection.

20. The brake adjusting shaft according to claim 18, wherein the cross-sections of the projections and the recess are formed to deviate from cross-section shapes of screwing tools.

21. The brake adjusting shaft according to claim 14, further comprising an intermediate chain wheel fixedly mounted on the front end of the first part, the head part being coupled with the intermediate chain wheel.

22. The brake adjusting shaft according to claim 21, wherein said intermediate chain wheel has a neck-shaped extension in which a recess is provided having a cross-sectional shape permitting a torque transmission, a projection of the head part having a corresponding cross-section being insertable into the recess to indirectly couple with the first part.

23. A torque transmitting head part for a brake adjusting shaft of a wear adjustment device in a motor vehicle brake, the head part comprising:

a separate structural part having first and second ends and being designed with a defined breaking area arranged between the first and second ends, a first end being configurable to couple directly or indirectly with the brake adjusting shaft in a rotationally resistant manner so as to permit a torque transmission, the second end being configurable to receive a torque transmitting tool;

wherein when a maximum permissible torque used in servicing the brake is exceeded, the separate structural part shears-off at the defined breaking area to axially separate the first and second ends of the separate structural part.

24. The head part according to claim 23 wherein the defined breaking area is formed by a groove surrounding the separate structural part.

25. The head part according to claim 24, wherein the separate structural part is produced of metal in one piece.

26. The head part according to claim 25 wherein the first end has a cross-section constructed to deviate from cross-sectional shapes of screwing tools.

* * * * *